(12) United States Patent
Viswanath et al.

(10) Patent No.: US 11,327,624 B2
(45) Date of Patent: *May 10, 2022

(54) ENVIRONMENTAL PERTINENCE INTERFACE

(71) Applicant: Atlassian Pty Ltd., Sydney (AU)

(72) Inventors: Sri Viswanath, Palo Alto, CA (US); Stephen Deasy, Mountain View, CA (US); Gene Drabkin, Los Gatos, CA (US); Marc Andrew Reisen, San Francisco, CA (US); Orpheus Mall, San Francisco, CA (US); Jon Hartlaub, Mountain View, CA (US)

(73) Assignee: ATLASSIAN PTY LTD., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,426

(22) Filed: Dec. 3, 2020

(65) Prior Publication Data

US 2021/0117027 A1    Apr. 22, 2021

Related U.S. Application Data

(63) Continuation of application No. 16/389,802, filed on Apr. 19, 2019, now Pat. No. 10,860,161, which is a
(Continued)

(51) Int. Cl.
  *G06F 3/048*   (2013.01)
  *H04W 4/02*    (2018.01)
  *G06F 16/435*  (2019.01)

(52) U.S. Cl.
  CPC ............ *G06F 3/048* (2013.01); *G06F 16/435* (2019.01); *H04W 4/025* (2013.01); *G06F 2219/10* (2013.01)

(58) Field of Classification Search
  CPC ...... G06F 3/0482; G06F 16/435; G06F 3/011; G06F 3/04815; G06F 3/04845;
  (Continued)

(56) References Cited

U.S. PATENT DOCUMENTS 10,175,759 B2    1/2019   Chaudhri et al.
10,304,065 B2    5/2019   Liang et al.
(Continued)

OTHER PUBLICATIONS

Kumar et al., An IT Appliance for Remote Collaborative Review of Mechanims of Injury to Children in Motor Vohicle Crashes; 2009; IEEE; 9 pages.*
(Continued)

*Primary Examiner* — Linh K Pham
(74) *Attorney, Agent, or Firm* — Brownstein Hyatt Farber Schreck, LLP

(57) ABSTRACT

An environmental pertinence interface generated by an example apparatus, method, and computer program product is provided. The apparatus receives an interface request from a mobile device and location data relating to the mobile device. The apparatus queries a database to identify environmental objects that satisfy a proximity threshold. The apparatus identifies environmental pertinence digital content items when the proximity threshold is satisfied. The apparatus applies user permissions rules to determine a user-permitted environmental pertinence digital content item set and generates an environmental pertinence interface for display by the mobile device.

17 Claims, 10 Drawing Sheets

Related U.S. Application Data continuation of application No. 15/633,624, filed on Jun. 26, 2017, now Pat. No. 10,338,762.

(60) Provisional application No. 62/438,133, filed on Dec. 22, 2016.

(58) Field of Classification Search
CPC ....... G06F 3/147; H04W 4/025; H04W 4/029; H04W 4/023; H04W 4/02
See application file for complete search history.

(56) References Cited

U.S. PATENT DOCUMENTS

| | | | |
|---|---|---|---|
| 10,908,771 B2* | 2/2021 | Berquam | G06F 3/04815 |
| 2012/0008526 A1 | 1/2012 | Borghei et al. | |
| 2012/0089659 A1* | 4/2012 | Halevi | G06F 3/04842 709/201 |
| 2013/0251132 A1* | 9/2013 | Manor | H04L 12/1818 379/202.01 |
| 2013/0282438 A1 | 10/2013 | Hunter et al. | |
| 2014/0053078 A1 | 2/2014 | Kannan | |
| 2014/0059695 A1* | 2/2014 | Parecki | H04L 63/102 726/26 |
| 2014/0067265 A1 | 3/2014 | Maston et al. | |
| 2014/0274145 A1 | 9/2014 | Cronin | |
| 2016/0133230 A1* | 5/2016 | Daniels | G06T 19/006 345/633 |
| 2016/0179455 A1 | 6/2016 | Liu | |
| 2016/0182613 A1 | 6/2016 | Brune | |
| 2016/0277455 A1* | 9/2016 | Xi | H04L 65/403 |
| 2016/0315986 A1* | 10/2016 | Chen | H04W 4/30 |
| 2017/0085390 A1 | 3/2017 | Belveal et al. | |
| 2017/0111762 A1* | 4/2017 | Arunkumar | H04L 63/1466 |
| 2017/0124303 A1 | 5/2017 | Baldwin et al. | |
| 2017/0149689 A1* | 5/2017 | Norman | H04L 67/2842 |
| 2017/0208364 A1 | 7/2017 | Glazier et al. | |
| 2017/0213224 A1 | 7/2017 | DeLuca et al. | |
| 2017/0222964 A1* | 8/2017 | Hoffman | H04W 4/023 |
| 2017/0353833 A1* | 12/2017 | de Barros Chapiewski | H04W 4/029 |
| 2018/0084517 A1* | 3/2018 | Do | H04W 60/00 |
| 2018/0181238 A1 | 6/2018 | Viswanath | |
| 2020/0249819 A1* | 8/2020 | Berquam | G06F 3/04815 |
| 2021/0286501 A1* | 9/2021 | Berquam | G06T 19/006 |

OTHER PUBLICATIONS

Kovachev et al., A Real-time Collaboration-enabled Mobile Augmented Reality System with Semantic Multimedia; 2012 IEEE; 10 pages.*

Kray et al., "Group Coordination and Negotiation Through Spatial Proximity Regions Around Mobile Devices on Augmented Tabletops," IEEE, 8 pages, 2008.

Ryu, et al., "Development of Device to Device (D2D) Communication Based New Mobile Proximity Multimedia Service Business Models," IEEE, 6 pages, 2013.

Zhang et al., "Energy-Efficient Architecture and Technologies for Device (D2D) Based Proximity Service," 11 pages, 2015.

* cited by examiner

ENVIRONMENTAL PERTINENCE INTERFACE

CROSS-REFERENCE TO RELATED APPLICATION(S)

This application is a continuation patent application of U.S. patent application Ser. No. 16/389,802, filed Apr. 19, 2019 and titled "Environmental Pertinence Interface," which is a continuation patent application of U.S. patent application Ser. No. 15/633,624, filed Jun. 26, 2017 and titled "Environmental Pertinence Interface," now U.S. Pat. No. 10,338,762, which is a nonprovisional patent application of and claims the benefit of U.S. Provisional Patent Application No. 62/438,133, filed Dec. 22, 2016, the disclosures of which are hereby incorporated herein by reference in their entireties.

FIELD

Various embodiments of the present invention are directed to providing improved computer systems that are configured to provide an enhanced user interface.

BACKGROUND

User interfaces supported by computer systems are intended to present or convey information to a user. Applicant has identified a number of deficiencies and problems associated with conventional user interfaces and associated computing devices. Through applied effort, ingenuity, and innovation, solutions to improve such techniques and devices have been realized and are described herein.

SUMMARY

In some example embodiments, an apparatus, including at least a processor and a memory associated with the processor having computer coded instructions therein, for generating an environmental pertinence interface is provided. The apparatus of this embodiment may include an environmental pertinence server coupled with the processor where the environmental pertinence server may be configured to receive an interface request from a mobile device associated with a user profile, receive device location data associated with the mobile device, and query an environmental object location database to identify environmental objects that satisfy a proximity threshold based on the device location data. The apparatus of this embodiment may, for each instance in which the proximity threshold is satisfied, query a digital content item database associated with a plurality of software applications to identify a preliminary environmental pertinence digital content item set. The apparatus of this embodiment may further apply user permissions rules to the preliminary environmental pertinence digital content item set to generate a user-permitted environmental pertinence digital content item set. The apparatus of this embodiment may still further generate the environmental pertinence interface based on each user-permitted environmental pertinence digital content item set and transmit the environmental pertinence interface to the mobile device.

In some cases, the environmental object location database may comprise second device location data of a second mobile device associated with a second user profile, and the environmental pertinence server may be configured to compare the device location data to the second device location data to identify if the second mobile device is one of the environmental objects that satisfy the proximity threshold.

In other cases, the environmental object location database may comprise object location data associated with a located object, and the environmental pertinence server may be configured to compare the device location data to the object location data to identify if the located object associated with the object location data is one of the environmental objects that satisfy the proximity threshold. In such a case, the located object may be associated with an object profile.

In some cases, the environmental object location database may comprise second device location data of a second mobile device associated with a second user profile and object location data associated with a located object, and the environmental pertinence server may be configured to compare the device location data to the second device location data and the object location data, respectively, to identify if one or more of the second mobile device and the located object are environmental objects that satisfy the proximity threshold.

In other cases, the environmental pertinence server may be further configured to rank the user-permitted environmental pertinence digital content item set according to one or more pertinence factors, identify digital content items that satisfy a pertinence threshold, and generate the environmental pertinence interface. In such a case, the pertinence factors further may comprise at least one of access time data, modification data, digital content size data, user exclusivity data, relationship data, authorship data, mouse over data, or key word data.

In some cases, the device location data associated with the mobile device may be determined via analyzing scheduling data received from the mobile device In further example embodiments, a method for presenting an environmental pertinence interface via an environmental pertinence server coupled with a processor is presented. The method of this embodiment may include the steps of receiving an interface request from a mobile device associated with a user profile, receiving device location data associated with the mobile device, and querying an environmental object location database to identify environmental objects that satisfy a proximity threshold based on the device location data. The method of this embodiment may, for each instance in which the proximity threshold is satisfied, include querying a digital content item database associated with a plurality of software applications to identify a preliminary environmental pertinence digital content item set. The method of this embodiment may further include applying user permissions rules to the preliminary environmental pertinence digital content item set and generating a user-permitted environmental pertinence digital content item set. The method of this embodiment may still further include generating the environmental pertinence interface based on each user-permitted environmental pertinence digital content item set and transmitting the environmental pertinence interface to the mobile device.

In some cases, the environmental object location database may comprise second device location data of a second mobile device associated with a second user profile, and the environmental pertinence server may be configured to compare the device location data to the second device location data to identify if the second mobile device is one of the environmental objects that satisfy the proximity threshold.

In other cases, the environmental object location database may comprise object location data associated with a located object, and the environmental pertinence server may be configured to compare the device location data to the object location data to identify if the located object associated with the object location data is one of the environmental objects that satisfy the proximity threshold. In such a case, the located object may be associated with an object profile.

In some cases, the environmental object location database may comprise second device location data of a second mobile device associated with a second user profile and object location data associated with a located object, and the environmental pertinence server may be configured to compare the device location data to the second device location data and the object location data, respectively, to identify if one or more of the second mobile device and the located object are environmental objects that satisfy the proximity threshold.

In other cases, the method may further include ranking the user-permitted environmental pertinence digital content item set according to one or more pertinence factors, identifying digital content items that satisfy a pertinence threshold, and generating the environmental pertinence interface. In such a case, the pertinence factors may include at least one of access time data, modification data, digital content size data, user exclusivity data, relationship data, authorship data, mouse over data, or key word data.

In some cases, the device location data associated with the mobile device may be determined via analyzing scheduling data received from the mobile device In some yet further example embodiments, a computer program product is provided that comprises at least one non-transitory computer-readable storage medium having computer-executable program code portions stored therein, the computer executable program code portions comprising program code instructions. The computer program product may include program code instructions for receiving an interface request from a mobile device associated with a user profile, receiving device location data associated with the mobile device, and querying an environmental object location database to identify environmental objects that satisfy a proximity threshold based on the device location data. The computer program product may include program code instructions, for each instance in which the proximity threshold is satisfied, for querying a digital content item database associated with a plurality of software applications to identify a preliminary environmental pertinence digital content item set. The computer program product may further include program code instructions for applying user permissions rules to the preliminary environmental pertinence digital content item set and generating a user-permitted environmental pertinence digital content item set. The computer program product may also include program code instructions for generating the environmental pertinence interface based on each user-permitted environmental pertinence digital content item set and transmitting the environmental pertinence interface to the mobile device.

In some cases, the environmental object location database may include second device location data of a second mobile device associated with a second user profile, and the environmental pertinence server may be configured to compare the device location data to the second device location data to identify if the second mobile device is one of the environmental objects that satisfy the proximity threshold.

In other cases, the environmental object location database may include object location data associated with a located object, and the environmental pertinence server may be configured to compare the device location data to the object location data to identify if the located object associated with the object location data is one of the environmental objects that satisfy the proximity threshold. In such a case, the located object may be associated with an object profile.

In some cases, the environmental object location database may include second device location data of a second mobile device associated with a second user profile and object location data associated with a located object, and the environmental pertinence server may be configured to compare the device location data to the second device location data and the object location data, respectively, to identify if one or more of the second mobile device and the located object are environmental objects that satisfy the proximity threshold.

In other cases, the computer program product may further include program code instructions for ranking the user-permitted environmental pertinence digital content item set according to one or more pertinence factors, identifying digital content items that satisfy a pertinence threshold, and generating the environmental pertinence interface. In such a case, the pertinence factors further may comprise at least one of access time data, modification data, digital content size data, user exclusivity data, relationship data, authorship data, mouse over data, or key word data.

In some cases, the device location data associated with the mobile device may be determined via analyzing scheduling data received from the mobile device

BRIEF DESCRIPTION OF THE DRAWINGS

Figure 1:
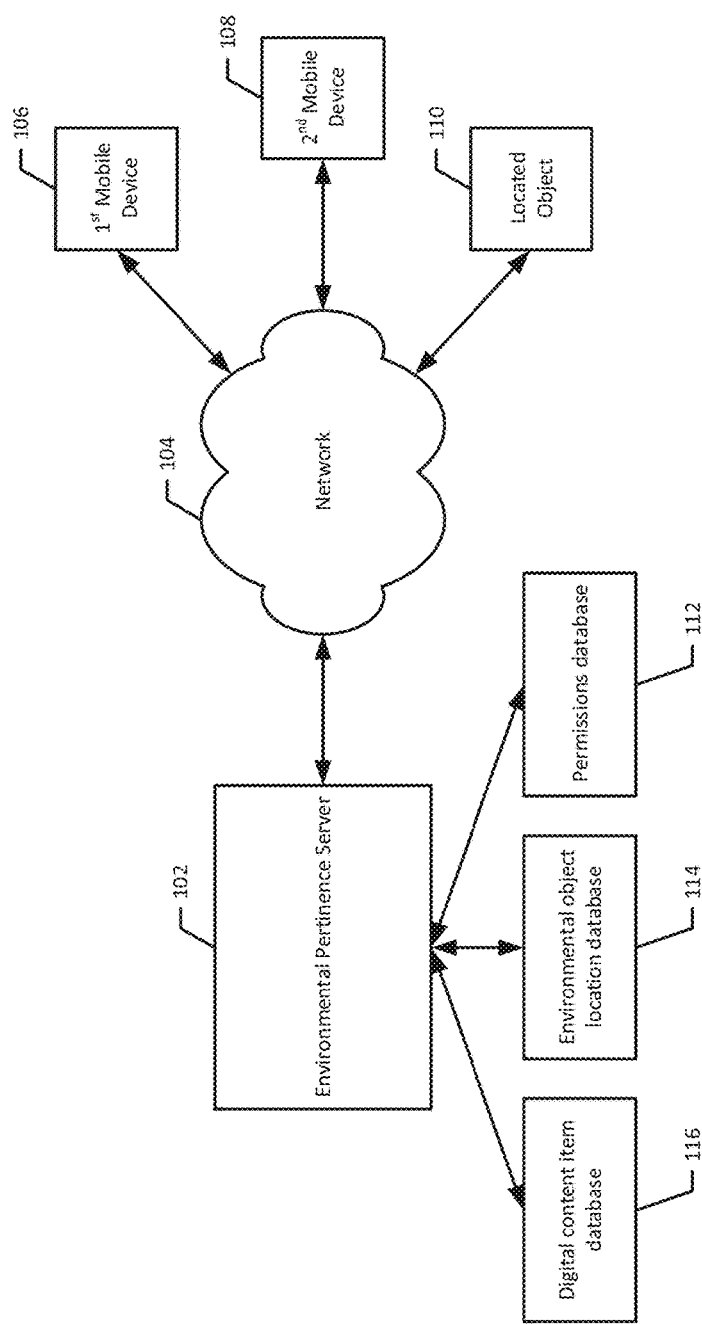
Figure 2:
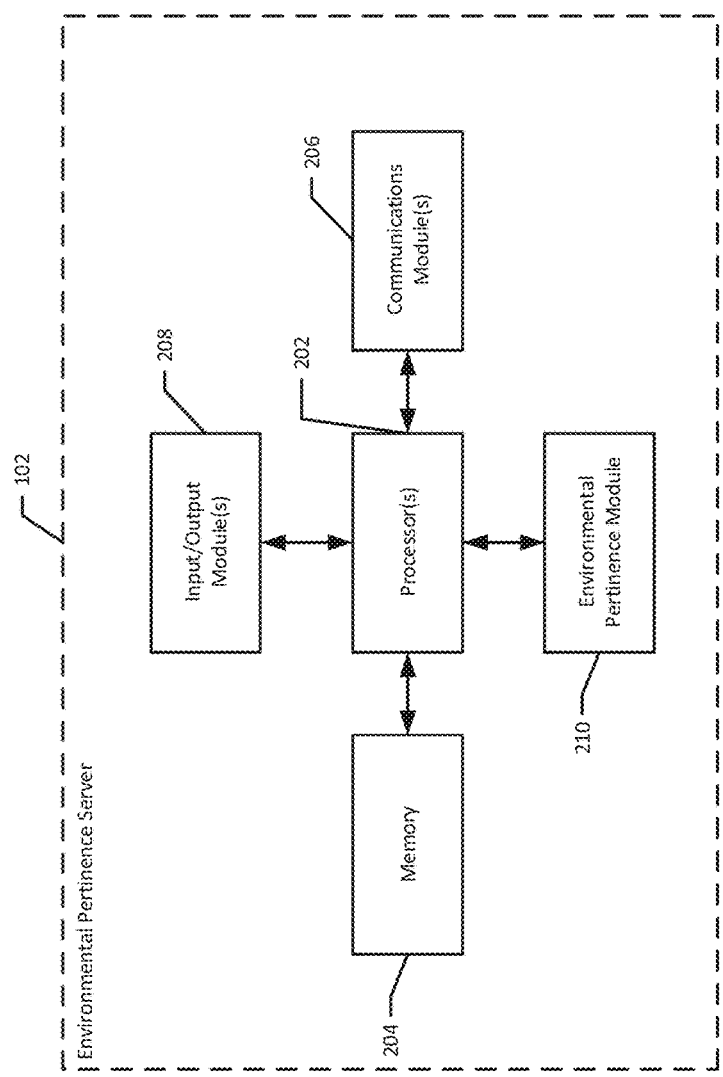
Figure 3:
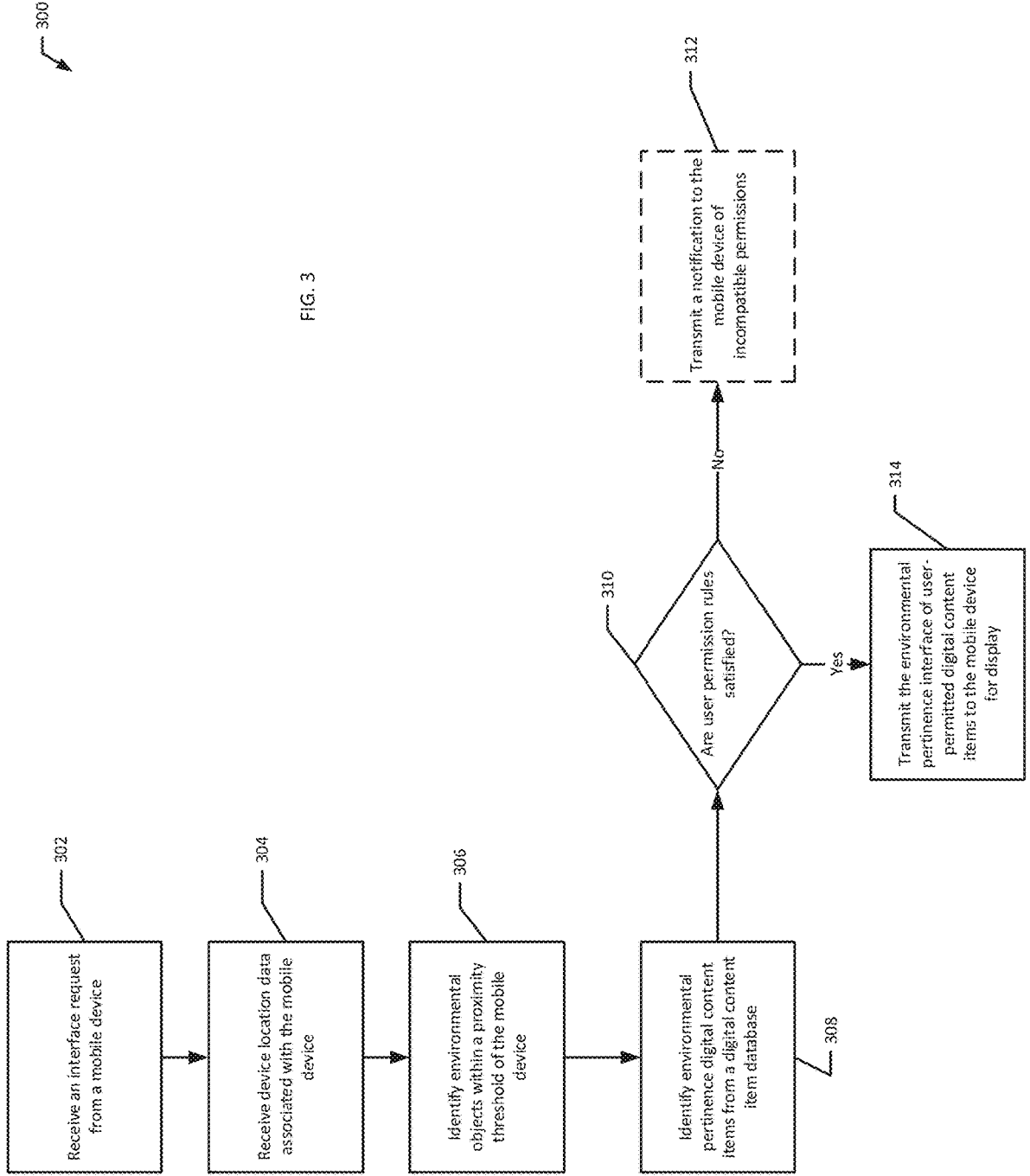
Figure 4:
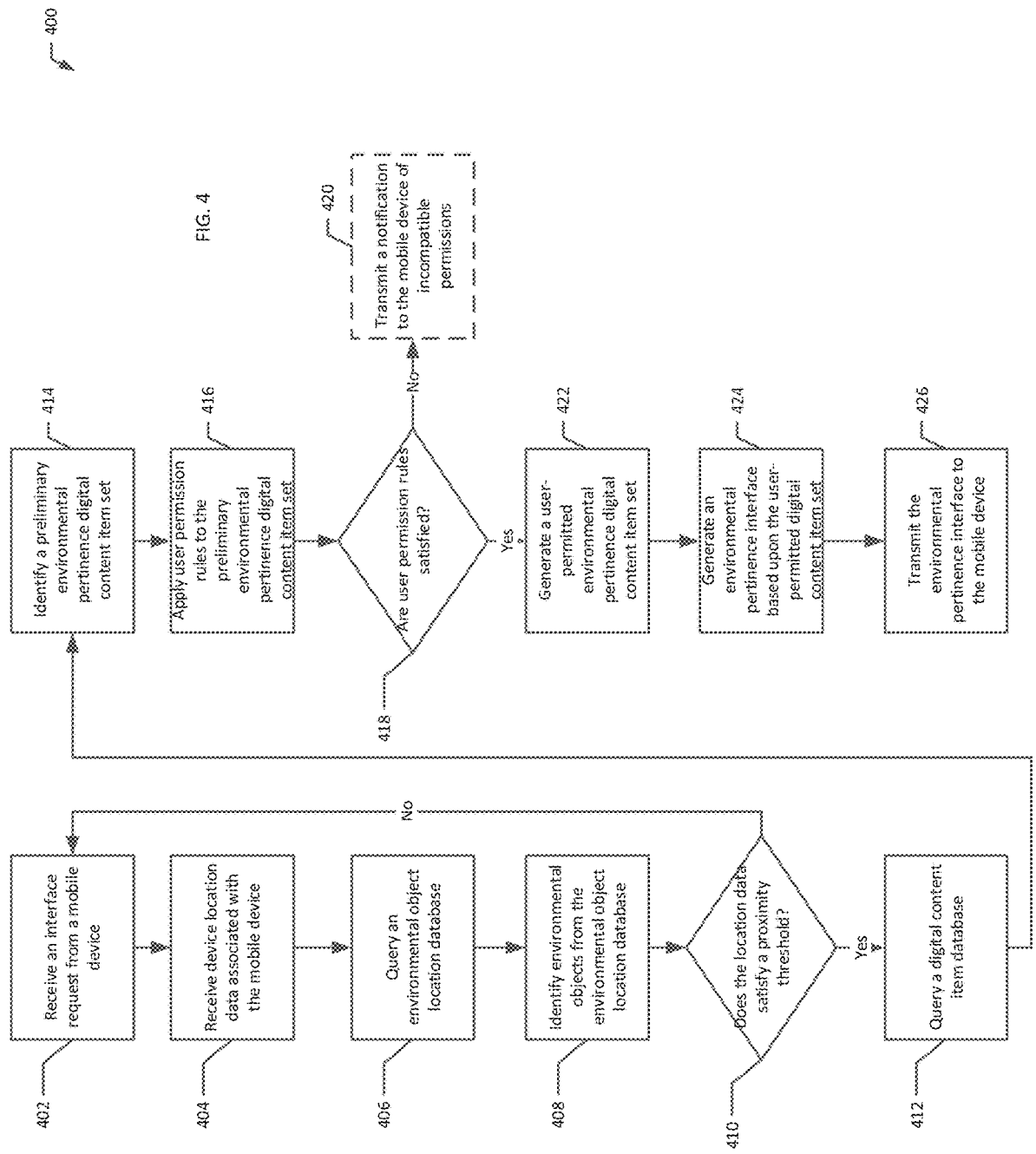
Figure 5:
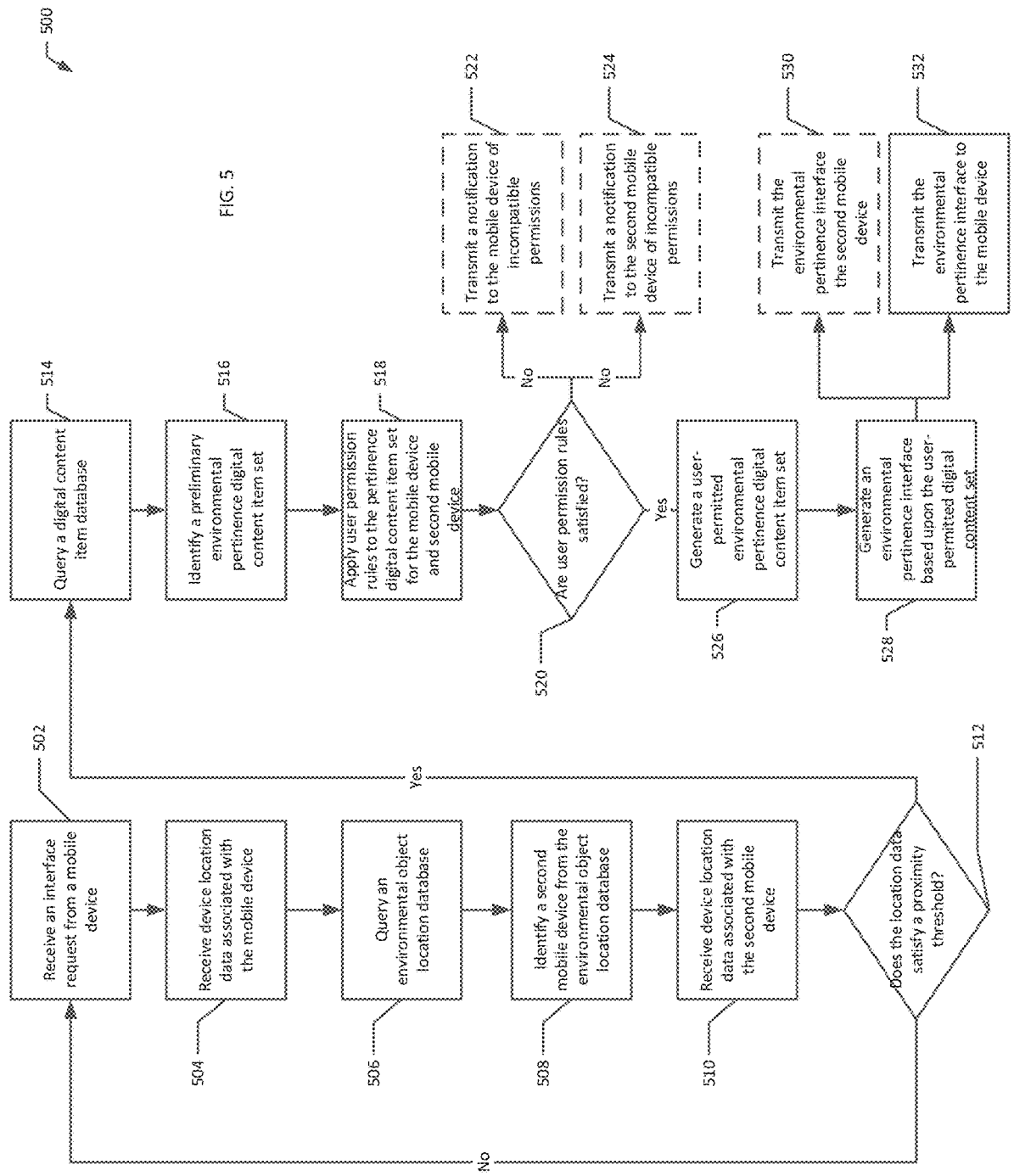
Figure 6:
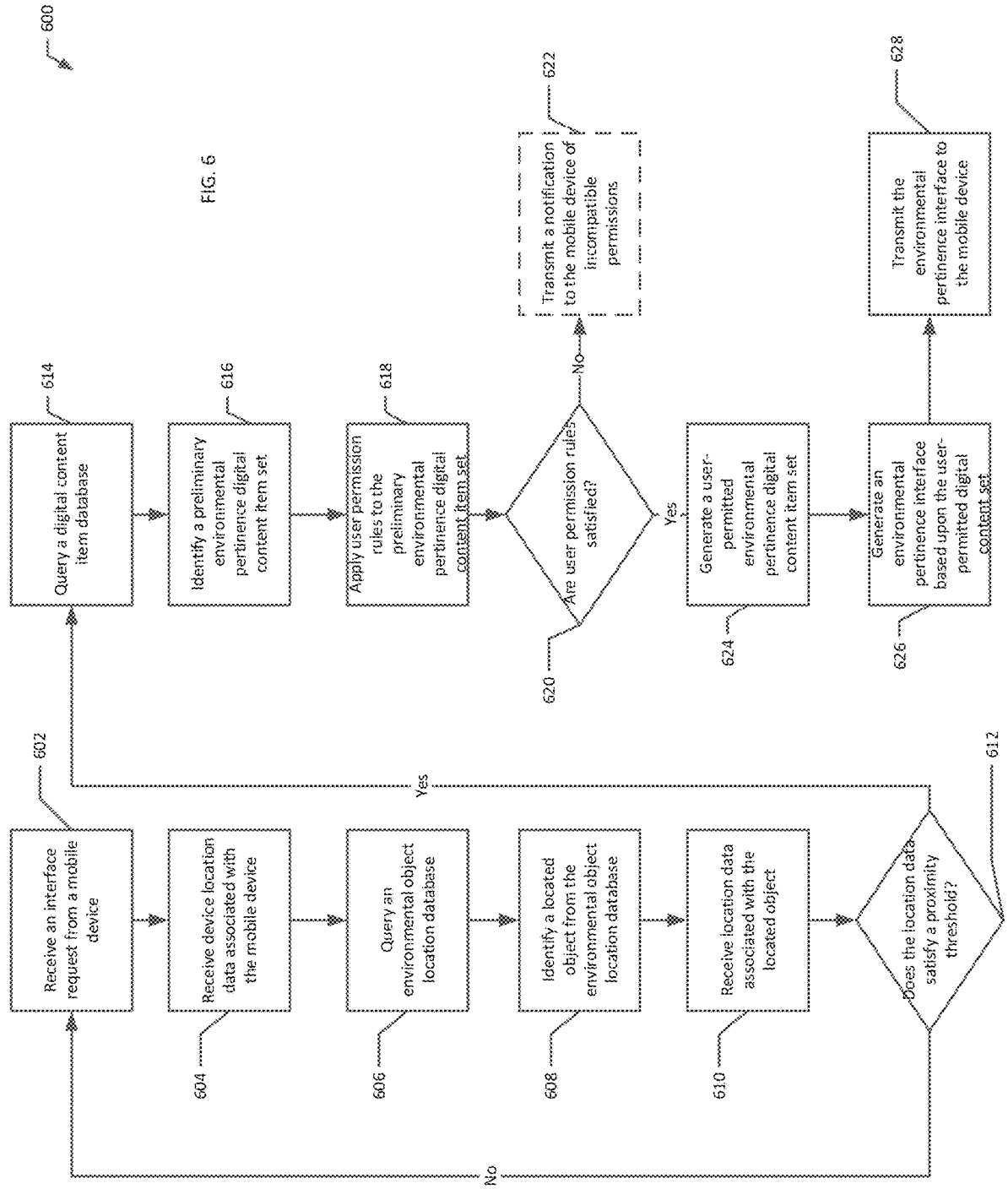
Figure 7:
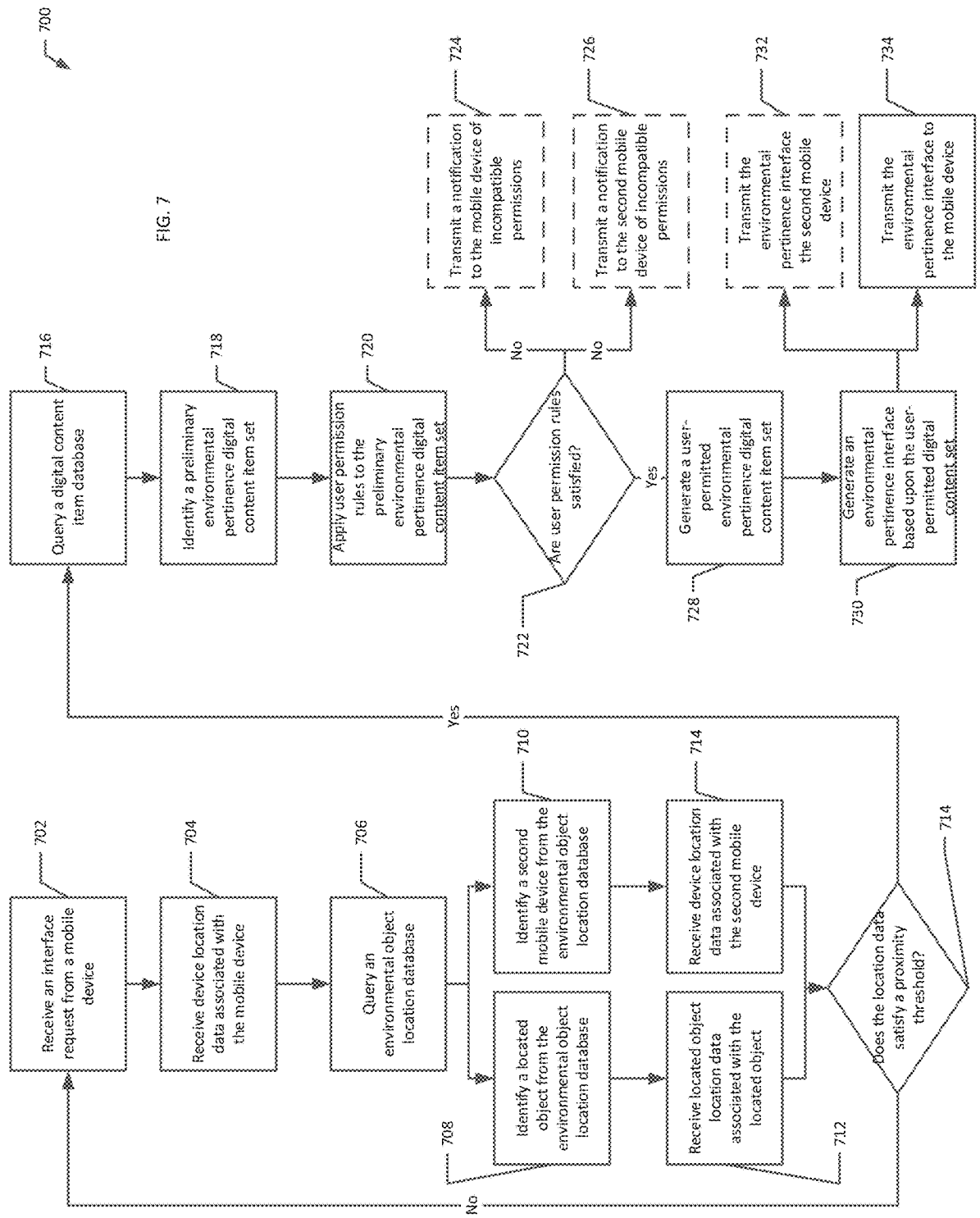
Figure 8:
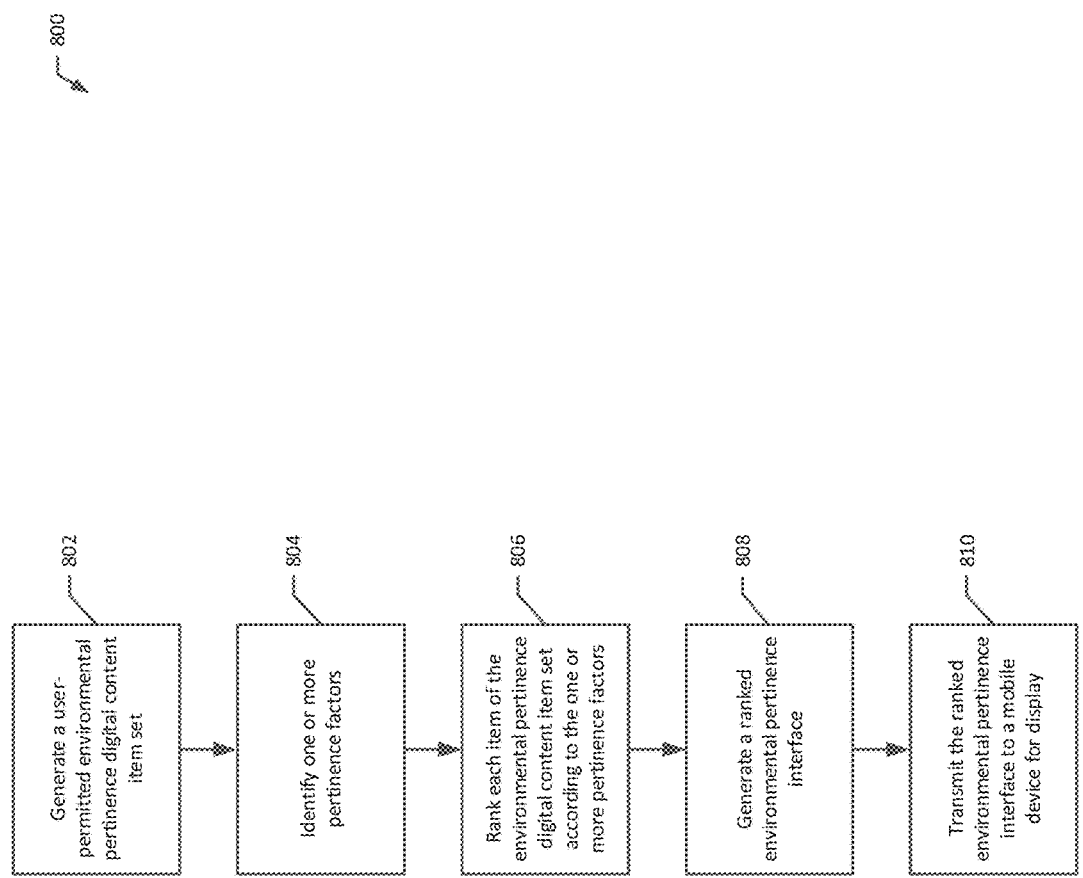
Figure 9:
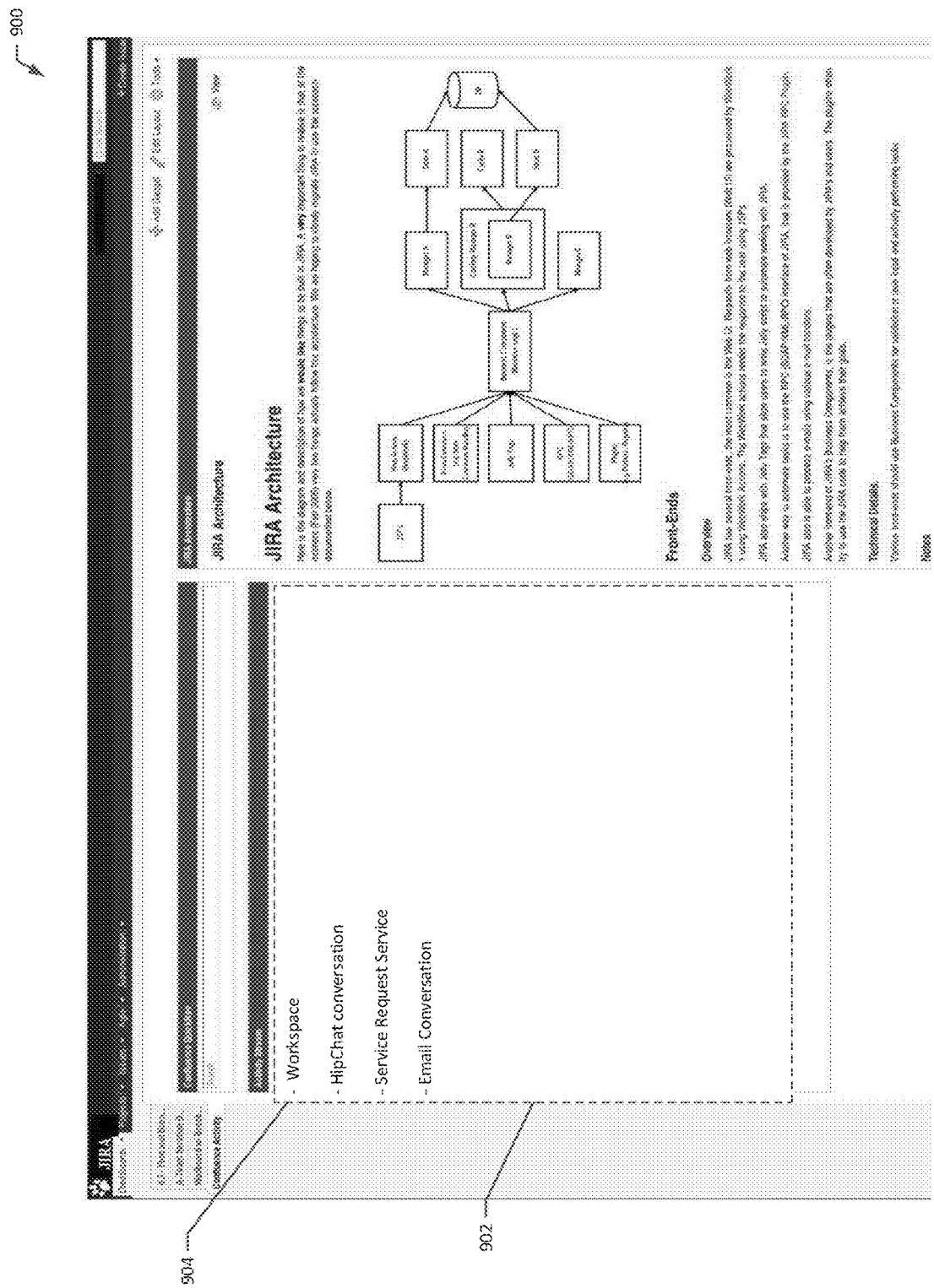

Having thus described certain example embodiments of the invention in general terms, reference will now be made to the accompanying drawings, which are not necessarily drawn to scale, and wherein:

FIG. 1 shows an example system having an environmental pertinence server structured in accordance with some embodiments;

FIG. 2 shows a schematic block diagram of the environmental pertinence server of FIG.1;

FIG. 3 shows a flowchart illustrating generation of an environmental pertinence interface, such as by the system of FIG. 1, in accordance with an example embodiment of the present invention;

FIG. 4 shows a flowchart illustrating generation of an environmental pertinence interface including proximity thresholds and user permissions, such as by the system of FIG. 1, in accordance with an example embodiment of the present invention;

FIG. 5 shows a flowchart illustrating generation of an environmental pertinence interface considering a second mobile device, such as by the system of FIG. 1, in accordance with an example embodiment of the present invention;

FIG. 6 shows a flowchart illustrating generation of an environmental pertinence interface considering a located object, such as by the system of FIG. 1, in accordance with an example embodiment of the present invention;

FIG. 7 shows a flowchart illustrating generation of an environmental pertinence interface considering a second mobile device and a located object, such as by the system of FIG. 1, in accordance with an example embodiment of the present invention;

FIG. 8 shows a flowchart illustrating ranking digital content items via pertinence factors, such as by the system of FIG. 1, in accordance with an example embodiment of the present invention;

FIG. 9 shows an example output of an environmental pertinence interface; and

Figure 10:
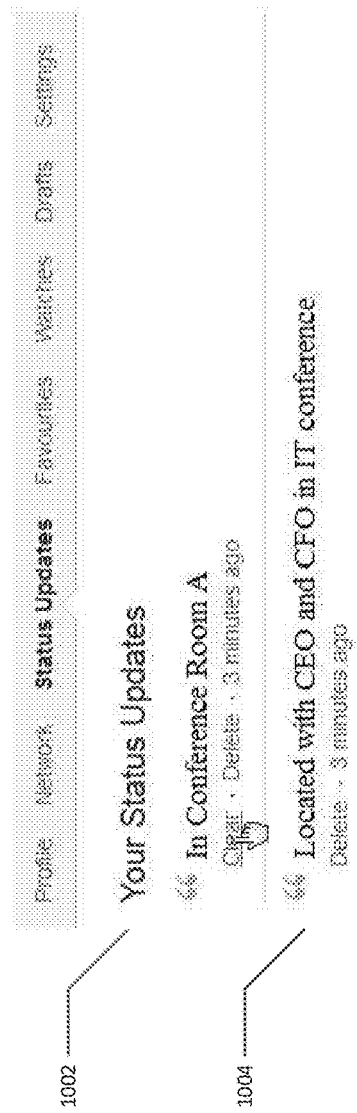

FIG. 10 shows various locations indicators in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the description may refer to an "apparatus." However, elements of the apparatus described herein may be equally applicable to the claimed method and computer program product. Thus, use of any such terms should not be taken to limit the spirit and scope of embodiments of the present invention.

Definition of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device, or may be received indirectly via one or more intermediary computing devices, such as, for example, one or more environmental pertinence servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, by one or more servers, relays, routers, network access points, base stations, hosts, and/or the like.

As used herein, the term "digital content items" refers to any electronic media content item that is intended to be used in either an electronic form or as printed output and which is retrievable by or otherwise associated with any of the plurality of software applications that are accessible by the environmental pertinence server. A digital content item, for example, may be in the form of a stored document associated with a collaborative project within a software application. Other digital content items include images, audio files, video files, text files, and the like. Digital content items may be any digitally storable item accessible by or otherwise associated with at least one software application as defined below.

As used herein, the terms "application program," "mobile application," "mobile app," and "software application" refer to computer-executable application software programmed to or capable of running on a processing unit of a computing device. Example software applications may include word processors, email, calendars, shared workspaces, issue tracking, software development tools, enterprise wild collaboration, code coverage analysis, source code repository, peer code review, project management, code hosting, service desks, status monitoring pages, internet browsers, collaborative spaces, text/voice/video chat, sign on identity, bug reporting, and the like including, but not limited to, JIRA®, JIRA Studio®, Confluence®, Atlassian Bamboo, Atlassian Crowd®, Atlassian Clover®, FishEye®, Atlassian Crucible®, GreenHopper®, Bitbucket®, Atlassian Bonfire®, SourceTree by Atlassian™, Atlassian Stash™ HipChat™, JIRA Service Desk™, JIRA Agile™, JIRA Capture™, and Trello®.

As used herein, the term "environmental pertinence server" refers to a computing service that is accessible via one or more computing devices or mobile devices, and that is operable to provide access to a plurality of software applications. In some examples, the environmental pertinence server may take the form of a central server disposed in communication with one or more additional servers and modules running software applications, and having access to one or more databases storing digital content items and application related data and/or the like.

As used herein, the term "environmental pertinence interface" refers to a digitally rendered user interface that is generated by an environmental pertinence server in accordance with various embodiments discussed herein and configured for display on a mobile device. An exemplary environmental pertinence interface is configured to enable a user to view and use one or more digital content items associated with one or more software applications. For example, an environmental pertinence interface may be configured to enable a user to access software applications for sending and receiving messages, viewing and editing shared workspaces, accessing development tools, managing projects, processing service requests, and the like. Exemplary environmental pertinence interfaces may be rendered in any desired form including, but not limited to, as a mobile application for display on a mobile device (e.g., a smartphone, tablet computer, wearable, etc.), a webpage or website for display on a mobile or non-mobile computing device via the Internet, and the like. The environmental pertinence server used to generate the environmental pertinence interface may receive various forms of data, including location data, associated with mobile devices, located objects, and any other environmental object.

As used herein, the terms "user permissions rules," "user permissions," and "permissions" refer to configurations, settings, instructions, data, or indications of rights that that are interpreted by a computer system to allow (or not allow) a user or a group of users to access, use, create, and/or publish digital content items and/or software applications. An exemplary user permissions rule may instruct a computer system to enable only the author of a digital content item to edit or delete the digital content item from memory accessible to the computer system.

As used herein, the terms "user profile" and "profile" refer to a collection of preferences, settings, configurations, mobile device identifiers, located object identifiers, data, and information associated with a specific user. A profile refers therefore to the explicit digital representation of a user's identity and other data or information associated with the user. A user profile configured in accordance with the present invention is accessible by one or more of the software applications that are supported by the computer system and, thus, may include application-specific preferences, settings, configurations, data, and information. In some embodiments, a user profile can be used to store a description of characteristics of the user and/or of the client device, as well as credentials and preferences of the user. In still another embodiment, a user profile may include user permissions and device location data reported by one or more mobile devices that are associated with the user profile.

As used herein, the terms "mobile computing device" and "mobile device" refer to computer hardware and/or software that is configured to access a service made available by the environmental pertinence server and, among various other functions, is configured to directly, or indirectly, report device location data. Example mobile devices may include a smartphone, a tablet computer, a laptop computer, a wearable device, a user's access badge and the like. In other embodiments, a mobile device may include a "smart device" that is equipped with chip of other electronic device that is configured to communicate with the environmental pertinence server via Bluetooth, NFC, Wi-Fi, 3G, 4G, RFID protocols, and the like. In one example, a mobile device may include an object that is equipped with a Wi-Fi radio that is configured to communicate with a Wi-Fi access point that is disposed in network communication with the environmental pertinence server. In another embodiment, a mobile device may include an object that is equipped with an RFID tag that is readable by an RFID reader that is disposed in network communication with the environmental pertinence server.

As used herein, the term "located object" refers to any object whose location is known by the system or environmental pertinence server, but which does not transmit its own location (e.g., device location data) via a network to the environmental pertinence server. For example, a located object may be a desk or other item of office furniture wherein a user or system administrator has defined location coordinates for the object and uploaded or otherwise stored such coordinates in a data repository accessible by the environmental pertinence server. In various embodiments, a located object may refer to spaces or rooms (e.g., offices, conference rooms, shared work spaces, etc.) that are identifiable on a digitally renderable map.

As used herein, the term "proximity threshold" refers to a defined mathematical difference between location coordinates for two objects (e.g., mobile device, located object, etc.). By way of example, a proximity threshold may be a mathematical representation of the distance between various mobile devices and located objects. In some embodiments, the proximity threshold may refer to a defined mathematical difference between an array of location coordinates (e.g., array of location data defining a perimeter of a room), and location coordinates associated with an object (e.g., mobile device, located object, etc.). By way of example, a proximity threshold may refer to a mathematical representation of a distance (e.g., a radius of 10 feet, a polygon defined by user-inputted data points, etc.) defined by a located object (e.g., a conference room, meeting location, etc.). In some other embodiments, the proximity threshold may refer to a defined mathematical difference between the average location coordinates for two objects. By way of example, a mobile device and located object may each iteratively transmit location data such that the mathematical representation of the distance between the mobile device and the located object varies. In such an embodiment, the proximity threshold may refer to the difference between the average location coordinate for the mobile device and the average location coordinate for the located object. The proximity threshold may be set by a system administrator or may be programmatically determined by the system perhaps with a trainable classifier or other machine learning model.

As used herein, the term "environmental object interest region" refers to a proximity threshold, as defined above, where a plurality of location coordinates are associated with an environmental object such that the environmental pertinence module, in conjunction with a processor, memory, and the like, may determine an interest region associated with the environmental object. Other objects (e.g., mobile devices, located objects, etc.) may be determined to be located within the environmental object interest region based upon comparing the location coordinates (e.g., location data) associated with these objects, and the plurality of location coordinates (e.g., array of location data) associated with the environmental object.

As used herein, the term "environmental object" refers to any mobile device and/or located object as defined herein.

As used herein, the term "environmental object location database" refers to a structured data set or repository for storing location data accessible by the environmental pertinence server, where the location data is associated with various mobile devices and located objects (e.g., environmental objects).

As used herein, the term "digital content item database" refers to a structured data set or repository for storing digital content items accessible by the environmental pertinence server, where the digital content items are associated with and accessible by one or more software applications.

As used herein, the term "permissions database" refers to a structured data set or repository for storing permission data accessible by the environmental pertinence server, where the permission data is associated with user permissions and user permission rules as defined herein.

As used herein, the term "preliminary environmental pertinence digital content item set" refers to a group of digital content items identified from a query, where the group of digital content items has been filtered, reduced, enhanced, or improved by comparison with location data associated with one or more environmental objects. In this regard, the user-permitted digital content item set may represent a subset or modified version of the digital content items stored by the digital content item database.

As used herein, the term "user-permitted environmental pertinence digital content item set" refers to a group of digital content items identified from a query, where the group of digital content items has been filtered, reduced, enhanced, or improved using user permissions. In this regard, the user-permitted digital content item set may represent a subset or modified version of the preliminary environmental digital content item set.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the term "module," encompasses hardware, software and/or firmware configured to perform one or more particular functions.

Overview

An apparatus (e.g., environmental pertinence server), method, and computer program product are provided for generating an environmental pertinence interface. In one embodiment, two users, and their associated mobile devices, may be located relative to one another such that a proximity threshold may be satisfied, such as when two users are meeting to work on a collaborative document. In such an embodiment, a mobile device associated with the first user may request an interface that displays digital content items for which the first user and the second user both have valid user permissions to access. The environmental pertinence server may query an environmental object location database to identify all environmental objects (e.g., the second mobile device associated with the second user) that satisfy a proximity threshold. Once the environmental pertinence server, via instructions executed by an environmental pertinence module, determines that the second mobile device satisfies the proximity threshold, the environmental pertinence server may query a digital content item database containing all digital content items related to all software applications supported by the environmental pertinence server and its associated network.

The environmental pertinence server may identify a preliminary environmental pertinence digital content item set from the digital content item database (e.g., digital content items relating to the software application utilized by the first mobile device and second mobile device in the above example). The environmental pertinence server may apply user permission rules to the preliminary environmental pertinence digital content item set, where the user permission rules are associated with the digital content items for which the first and second mobile device, and their associated users, have a right to access. The environmental pertinence server may generate an environmental pertinence interface containing the digital content items for which the first and second mobile device have access, and may transmit the environmental pertinence interface to the first mobile device for display.

In another embodiment, the environmental objects identified by the environmental pertinence server when querying an environmental object location database, may correspond to located objects with associated object profiles. By way of continued example, a first and second mobile device may be located within a conference room (e.g., a located object) where the location of the conference room is defined by a plurality of location data points. As above, the environmental pertinence server may complete the same process for generating an environmental pertinence interface now considering the location of the mobile devices with regard to the conference room.

In some further embodiments, the apparatus, method, and computer program product may utilize pertinence factors to rank all permitted software applications and/or digital content items for use when generating an environmental pertinence interface. In some embodiments, the software applications and/or digital content items may be ranked or displayed in a way that conveys their estimated importance to the user based on information stored to the network and to the user profile associated with the first mobile device, other mobile devices, and/or located objects.

Exemplary System Architecture

With reference to FIG. 1, an example system 100 is illustrated with an environmental pertinence server 102 communicably connected with a first mobile device 106, a second mobile device 108, and a located object 110 via a network 104. The example system 100 may also include a digital content item database 116, environmental object location database 114, and a permissions database 112 in communication with the environmental pertinence server 102.

The environmental pertinence server 102 may include circuitry, networked processors, or the like configured to perform some or all of the environmental pertinence server-based processes described herein, and may be any suitable network environmental pertinence server and/or other type of processing device. In some embodiments, the environmental pertinence server 102 may function as a "cloud" with respect to the first mobile device 106. In that sense, the environmental pertinence server 102 may include several servers performing interconnected and/or distributed functions. To avoid unnecessarily overcomplicating the disclosure, the environmental pertinence server 102 is shown and described herein as a single server.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first mobile device 106 may be associated with a user and/or user profile. Additional mobile devices (i.e., second mobile device 108) may be also be associated with a second user and/or second user profile. Although two mobile devices are shown, system 100 may include any number of mobile devices that may be associated with various other users and/or user profiles. First mobile device 106 and second mobile device 108 may be cellular telephones (including smartphones and/or other types of mobile telephones), laptops, tablets, electronic readers, e-book devices, media devices, wearables or any combination of the above.

The located object 110 may be also associated with an object profile. The located object 110 may be any object known by the system 100 where the system 100 knows the location of the located object 110 without active communication by the located object 110 (i.e., a user defined or inputted location, a stored location). By way of example, a located object 110 may be an office wherein a user has defined the location of the office and inputted the location coordinates into a memory (e.g., environmental object location database 114) accessible by the system 100. Although shown as a single located object 110, the system 100 may include any number of located objects associated with various object profiles.

In some embodiments, the first mobile device 106 may be configured to generate and/or provide an environmental pertinence interface to a display of the mobile device. The environmental pertinence interface may be configured to access various digital content items associated with software applications. The first mobile device 106 may also allow a user to input commands (such as selecting a particular digital content item) which may be conveyed to the environmental pertinence server 102 via the network 104 as input data. Input data may be generated via one or more input devices including, without limitation, a touchscreen, a microphone, a camera, and/or a motion sensor device (e.g., an accelerometer, gyroscope, etc.).

The digital content item database 116 may be any suitable network storage device configured to store some or all of the information described herein. The digital content item database 116 may receive data from the environmental pertinence server 102 (e.g., via a memory 204 and/or processor(s) 202), and may store this data. As such, the digital content item database 116 may include, for example, one or more database systems, backend data servers, network databases, cloud storage devices, etc. To avoid unnecessarily overcomplicating the disclosure, the digital content item database 116 is shown and described herein as a single database.

The environmental object location database 114 may be any suitable network storage device configured to store some or all of the information described herein. The environmental object location database 114 may receive data from the environmental pertinence server 102 (e.g., via a memory 204 and/or processor(s) 202), and may store this data. As such, the environmental object location database 114 may include, for example, one or more database systems, backend data servers, network databases, cloud storage devices, etc. To avoid unnecessarily overcomplicating the disclosure, the environmental object location database 114 is shown and described herein as a single database.

The permissions database 112 may be any suitable network storage device configured to store some or all of the information described herein. The permissions database 112 may receive data from the environmental pertinence server 102 (e.g., via a memory 204 and/or processor(s) 202), and may store this data. As such, the permissions database 112 may include, for example, one or more database systems, backend data servers, network databases, cloud storage devices, etc. To avoid unnecessarily overcomplicating the disclosure, the permissions database 112 is shown and described herein as a single database.

FIG. 2 shows a schematic block diagram of an example circuitry 200, some or all of which may be included in the environmental pertinence server 102, the first mobile device 106, or the second mobile device 108. In accordance with some example embodiments, circuitry 200 may include various means, such as one or more processors 202, memory(s) 204, communications modules 206, input/output modules 208, and environmental pertinence module 210.

In some embodiments, such as when circuitry 200 is included in the environmental pertinence server 102 or the mobile device 106, the environmental pertinence module 210 may also or instead be included. For example, where the environmental pertinence module 210 is included with the first mobile device 106, the module may be configured to facilitate the functionality discussed herein regarding generating an environmental pertinence interface. In another example, where environmental pertinence module 210 is included with environmental pertinence server 102, the module may be configured to receive the data associated with the first mobile device 106 and to process the associated user data in order to generate an environmental pertinence interface.

The means of circuitry 200 as described herein may be embodied as, for example, circuitry, hardware elements (e.g., a suitably programmed processor, combinational logic circuit, integrated circuit, or the like), a computer program product comprising computer-readable program instructions stored on a non-transitory computer-readable medium (e.g., memory 204) that is executable by a suitably configured processing device (e.g., processor 202), or some combination thereof.

The processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, the processor 202 may comprise a plurality of processing means. The plurality of processing means may be embodied on a single computing device or may be distributed across a plurality of computing devices collectively configured to function as the circuitry 200. The plurality of processing means may be in operative communication with each other and may be collectively configured to perform one or more functionalities of the circuitry 200 as described herein. In an example embodiment, the processor 202 may be configured to execute instructions stored in the memory 204 or otherwise accessible to the processor 202. These instructions, when executed by the processor 202, may cause the circuitry 200 to perform one or more of the functionalities described herein.

Whether configured by hardware, firmware/software methods, or by a combination thereof, the processor 202 may comprise an entity capable of performing operations according to embodiments discussed herein while configured accordingly. Thus, for example, when the processor 202 is embodied as an ASIC, FPGA or the like, the processor 202 may comprise specifically configured hardware for conducting one or more operations described herein. As another example, when the processor 202 may be embodied as an executor of instructions, such as may be stored in the memory 204, the instructions may specifically configure the processor 202 to perform one or more algorithms, methods, or operations described herein. For example, the processor 202 may be configured to execute operating system applications, firmware applications, media playback applications, media editing applications, among others.

The memory 204 may comprise, for example, volatile memory, non-volatile memory, or some combination thereof. Although illustrated in FIG. 2 as a single memory, the memory 204 may comprise a plurality of memory components. The plurality of memory components may be embodied on a single computing component or distributed across a plurality of computing components. In various embodiments, the memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. The memory 204 may be configured to store information, data, applications, instructions, or the like for enabling the circuitry 200 to carry out various functions in accordance with example embodiments discussed herein. For example, in at least some embodiments, the memory 204 may be configured to buffer input data for processing by the processor 202. Additionally or alternatively, in at least some embodiments, the memory 204 may be configured to store program instructions for execution by the processor 202 and/or data for processing by the processor 202. The memory 204 may store information in the form of static and/or dynamic information. This stored information may be stored and/or used by the circuitry 200 during the course of performing its functionalities.

The communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry, component, server, module, or the like. In some embodiments, the communications module 206 (like other components discussed herein) can be at least partially embodied as or otherwise controlled by the processor 202. In this regard, the communications module 206 may be in communication with the processor 202, such as via a bus. The communications module 206 may include, for example, an antenna, a transmitter, a receiver, a transceiver, network interface card and/or supporting hardware and/or firmware/software for enabling communications. The communications module 206 may be configured to receive and/or transmit any data that may be stored by memory 204 using any protocol that may be used for communications. The communications module 206 may additionally and/or alternatively be in communication with the memory 204, the input/output module 208, and/or any other component of the circuitry 200, such as via a bus. The communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, or 5.6 GHz communication systems), infrared, GSM, GSM plus EDGE, CDMA, quad-band, and other cellular protocols, VOIP, or any other suitable protocol.

The input/output module 208 may be in communication with the processor 202 to receive an indication of an input and/or to provide an audible, visual, mechanical, or other output. In that sense, the input/output module 208 may include means for performing analog-to-digital and/or digital-to-analog data conversions. The input/output module 208 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. In embodiments where the circuitry 200 may be implemented as an environmental pertinence server 102, as shown in FIG. 2, aspects of the input/output module 208 may be reduced as compared to embodiments where circuitry 200 may be implemented as an end-user machine or other type of device designed for complex user interactions (i.e., first mobile device 106). In some embodiments (like other components discussed herein), the input/output module 208 may even be eliminated from the circuitry 200. Alternatively, such as in embodiments wherein the circuitry 200 is embodied as an environmental pertinence server, at least some aspects of the input/output module 208 may be embodied on an apparatus used by a user that is in communication with the circuitry 200. The input/output module 208 may be in communication with the memory 204, the communications module 206, or any other component(s), such as via a bus. Although more than one input/output module and/or other component can be included in the circuitry 200, only one is shown in FIG. 2 to avoid overcomplicating the disclosure (e.g., like the other components discussed herein).

In some embodiments, the environmental pertinence module 210 may also or instead be included and configured to perform the functionality discussed herein related providing an environmental pertinence interface. In some embodiments, some or all of the functionality of the environmental pertinence module 210 may be performed by the processor 202. In this regard, some or all of the example processes and algorithms discussed herein can be performed by at least one processor 202 and/or environmental pertinence module 210. For example, non-transitory computer readable storage media can be configured to store firmware, one or more application programs, and/or other software, which include instructions and other computer-readable program code portions that can be executed to control processors of the components of the environmental pertinence server 102 by the circuitry 200 to implement various operations, including the examples shown herein. As such, a series of computer-readable program code portions may be embodied in one or more computer program products and can be used, with a device, environmental pertinence server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, environmental pertinence servers, databases, systems, and the like. Accordingly, embodiments may include various means comprised entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of example process flowcharts describing functionality that may be implemented by one or more components discussed above. Each block of the block diagrams and process flowcharts, and combinations of block diagrams and process flowcharts, respectively, can be implemented by various means including computer program instructions. These computer program instructions may be loaded onto a general purpose computer, special purpose computer, or other programmable data processing apparatus, such as the processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Environmental Pertinence Interface

The method, apparatus (e.g., environmental pertinence server 102), and computer program product of an example embodiment will now be described in conjunction with the operations illustrated in FIGS. 3-8. With reference to FIG. 3, a flowchart is provided that illustrates a method completed by the environmental pertinence server 102 for generating an environmental pertinence interface 300 for use with some embodiments described herein. The apparatus may receive an interface request from a mobile device at Block 302 and may receive device location data associated with the mobile device at Block 304. The received device location data may be generated by the mobile device using Global Positioning Satellite ("GPS") technologies. Alternatively or additionally, in some embodiments, location data may be generated by detection of a LAN or access point (e.g., Bluetooth or Wi-Fi technologies) or by reading a tag having a known location (e.g., Radio-frequency identification ("RFID"), QR code, or barcode technologies) using a mobile device coupled reader or scanner.

The apparatus may further include identifying environmental objects within a proximity of the mobile device at Block 306 based on the received location data and may identify environmental pertinence digital content items from a digital content database associated with the identified environmental objects at Block 308. The apparatus may determine if the mobile device, or user profile(s) associated with the mobile device, have permission to access the digital content items at Block 310. Optionally, in some embodiments, if the mobile device and the environmental objects do not have permission to access the digital content items, the apparatus may transmit a notification to the mobile device of incompatible permissions at Block 312. If the mobile device and environmental objects have permission to access the digital content items, the apparatus may display the environmental pertinence interface comprising permitted digital content items on the mobile device at Block 314.

With continued reference to FIG. 3, the environmental pertinence server 102 may include means, such as the processor 202, the communication module(s) 206, the environmental pertinence module 210, or the like, for receiving an interface request from a mobile device at Block 302 and receiving device location data associated with the mobile device at Block 304. The apparatus may, in some embodiments, receive an interface request from a mobile device at Block 302 by manual request from a user associated with the mobile device. In such an embodiment, the user may input a request (via text, voice, among others) at their mobile device, which may convey the interface request to the environmental pertinence server 102.

In alternate embodiments, the apparatus may receive an interface request at Block 302 without input from a user. In such an embodiment, the mobile device may determine that an interface is desired based upon the location of the mobile device. By way of example, a mobile device and associated user may enter a conference room. The mobile device may be running a software application that is configured to periodically update the user interface of the mobile device. The mobile device may be further configured to frequently report device location data to the environmental pertinence server (e.g., periodically pushing location data determined based on the GPS, WiFi, Bluetooth, RFID, QR code, or barcode technologies referenced above). Having received the device location data from the mobile device, the environmental pertinence server may query the environmental object location database to identify a located object that is within a proximity threshold of the reporting mobile device. In this example, the environmental pertinence server identifies a conference room (i.e., a located object) as being proximate the mobile device.

In some further alternative embodiments, the apparatus may frequently receive an interface request at Block 302, without input from a user, anytime the mobile device is in communication with the apparatus. In such an embodiment, the apparatus (e.g., the environmental pertinence server) may determine that an interface is desired based upon the mobile device's connection to a network in communication with the apparatus. By way of example, a mobile device and associated user may enter a building (e.g., the user's office building) and connect to an associated network (i.e., the mobile device may connect to the office's Wi-Fi). The mobile device may be running a software application that is configured to periodically update the user interface. The environmental pertinence server may be further configured to frequently receive device location data from the mobile device while the mobile device is in communication with the environmental pertinence server. Having received the device location data from the mobile device, the environmental pertinence server may frequently query the environmental object location database to identify located objects that are within a proximity threshold of the reporting mobile device. In this example, the environmental pertinence server identifies a conference room (i.e., a located object) as being proximate the mobile device. This example further illustrates an embodiment where the environmental pertinence server frequently pushes (e.g., transmits data) an environmental pertinence interface to the mobile device based upon the location (e.g., by analyzing location data) of the mobile device.

By way of an additional example, the environmental pertinence module 210 may also analyze scheduling data (e.g., a user's calendar such as an Outlook® calendar, Google® calendar, or the like) in addition to, or in lieu of, location data received from the mobile device to determine a location (i.e., device location data) associated with the mobile device. In some embodiments, the scheduling data may be received from the mobile device while, in other embodiments, the scheduling data may be retrieved or received from a remote server. The environmental pertinence module 210 may use meeting time data and meeting location data extracted from scheduling data to determine a likely location of the mobile device. For example, if a user of the mobile device is scheduled to participate in a design review meeting in conference room Alpha of building Beta at 3:00 PM PST, the environmental pertinence module 210 may determine that conference room Alpha of building Beta (or stored location coordinates associated with the same) is the likely location of the mobile device associated with such user at 3:07 PM PST. This likely location may be confirmed through location data received from the mobile device such as through received GPS coordinates or indications of WiFi access point detection associated with building Beta. In still other embodiments, this likely location may be confirmed by prompting the user of the device to input a location confirmation (e.g., a notification requesting that the user confirm they are in conference room Alpha of building Beta).

With respect to receiving device location data at Block 304, in some embodiments, the mobile device (e.g., first mobile device 106 in FIG. 1) may transmit location data associated with the mobile device to the environmental pertinence server 102 at various intervals. In other embodiments, the mobile device may not transmit its location to the environmental pertinence server at various intervals, and may require that the environmental pertinence server 102 request the location of the mobile device. In some still further embodiments, the environmental pertinence server 102 and/or environmental pertinence module 210, may receive device location data related to a mobile device due to the docking or network access of the mobile device at a location (e.g., when a phone is docked at a computer or network access is obtained and the device location data is transmitted via a LAN).

Once the device location data associated with the mobile device has been received at Block 304, the environmental pertinence server 102 may include means, such as the processor 202, the communication modules(s), the environmental pertinence module 210, or the like, for identifying environmental pertinence digital content items from a digital content item database at Block 308. The apparatus may first identify environmental objects within a proximity threshold of the mobile device at Block 306 based on comparing stored environmental object location information to the received device location data. The identified environmental objects of Block 306 may be used to identify environmental pertinence digital content items from a digital content item database at Block 308. The apparatus may access a digital content item database (e.g., database 116) that comprises all possible digital content items known by the apparatus or stored by the database 116. The apparatus may then determine a portion of all possible digital content items associated with the identified environmental objects of Block 306. This portion may, in some embodiments, be defined as a preliminary environmental pertinence digital content item set. By way of example, when the environmental objects are a second mobile device and a conference room, a preliminary environmental pertinence digital content item set may be all digital content items associated with the mobile device, the second mobile device, and the conference room.

The apparatus may also determine if appropriate user permissions exist to access the digital content items found in the preliminary environmental pertinence digital content item set at Block 310. These permissions may be stored on the mobile device in some embodiments, and may also be stored by the environmental pertinence server 102 or in permissions database 112. The apparatus may further determine which digital content items the mobile device (e.g., a user profile associated with the mobile device) has permission to access, and may group these items into a further portion of the digital content item set. This further portion may, in some embodiments, be defined as a user-permitted environmental pertinence digital content item set. In some embodiments, where an identified environmental object is a second mobile device associated with a second user profile (e.g., or any number of additional mobile devices), the apparatus may also determine if appropriate user permissions exist for the second mobile device to access the digital content items found in the preliminary environmental pertinence digital content item set. Such an embodiment is discussed more fully below with reference to FIG. 4.

Once the user-permitted environmental pertinence digital content item set has been defined, the environmental pertinence server 102 may include means, such as the processor 202, the input/output module 208, the communications module(s) 206, the environmental pertinence module 210, or the like, for transmitting the user permitted environmental pertinence digital content item set as part of an environmental pertinence interface for display to a mobile device at Block 314. Although described as transmitted to a mobile device for display at Block 314, the present disclosure contemplates that any device or object capable of receiving digital content may be utilized to display the environmental pertinence interface such as a television, monitor, projector, etc. In some embodiments, the apparatus may, upon determining that the mobile device does not have a valid permission for any digital content item, transmit a notification to the mobile device of incompatible permissions at Block 312. However, in some embodiments, such as when no manual user request has been made for an interface as discussed above, the apparatus may not transmit a notification to the mobile device of incompatible permissions, and may not notify a user associated with the mobile device that the method has occurred. By way of example, the method performed by the apparatus may complete without determining an environmental pertinence interface and, for the sake of visibility to the user, may continue as if the method never occurred.

With reference to FIG. 4, a flowchart is provided that illustrates a more particular method for generating an environmental pertinence interface 400 for use with some embodiments described herein, with each step of the method described more fully in the paragraphs following. The apparatus (e.g., environmental pertinence server) may include receiving an interface request from a mobile device at Block 402, and may receive device location data associated with the mobile device at Block 404. The apparatus may query an environmental object location database at Block 406 and may identify environmental objects from the environmental object location database at Block 408. The apparatus may determine if the location data associated with the environmental objects and mobile device satisfy a proximity threshold at Block 410. If the environmental objects satisfy the proximity threshold, the apparatus may query a digital content item database at Block 412. The apparatus may further identify a preliminary environmental pertinence digital content item set from the digital content item database at Block 414. The apparatus may apply user permission rules to the environmental pertinence digital content item set at Block 416. The apparatus may determine if user permissions are present for the digital content items at Block 418, and, if so, may generate a user-permitted environmental pertinence digital content set at Block 422. In some embodiments, if user permissions are not present, the apparatus may transmit a notification to the mobile device of incompatible permissions at Block 420. The apparatus may generate an environmental pertinence interface based upon the permitted digital content set at Block 424, and may transmit the environmental pertinence interface to the mobile device at Block 426.

With continued reference to FIG. 4, following receiving device location data associated with a mobile device at Block 404, the apparatus may query an environmental object location database (e.g., database 114), and may identify environmental objects from the environmental object location database at Block 408. By way of example, these environmental objects may include additional mobile devices (e.g., second mobile device 108 in FIG. 1) or located object(s) 110. As defined above, these mobile devices may be cellphones, tablets, RFID tagged objects, or any device capable of transmitting its location to the environmental pertinence server 102. Located objects, also defined above, may include objects such as desks, offices, doorways, conference rooms, shared spaces, work desks, etc., where the location of the object may be known by the environmental pertinence server 102 without communication with the located object.

The apparatus may determine if these identified environmental objects satisfy a proximity threshold at Block 410. The proximity threshold may be calculated by comparing the device location data corresponding with a mobile device received at Block 404 with location data associated with an environmental object. The location data associated with the environmental object may be in some embodiments stored as part of the environmental object location database 114, or may be received upon request by the environmental pertinence server 102. The apparatus may compare these location data sets to determine if the proximity threshold has been satisfied. By way of example, the environmental object may be a second mobile device with second device location data indicating to the environmental pertinence server that the second mobile device satisfies the proximity threshold (i.e., is close enough to the mobile device).

As will be appreciated in light of the present disclosure, location data corresponding to a mobile device or located object may be received by the apparatus from a variety of sources. By way of example, the environmental pertinence server may receive device location data corresponding to a user and associated mobile device via a Wi-Fi access point to which the mobile device is connected, location data associated with a user's access badge, and the like. In such an example, the environmental pertinence server may determine the reliability of each source of location data. Some sources of location data may provide a more accurate representation of the location of the user due to the accuracy inherent to these sources. The environmental pertinence server may receive location data from a variety of sources, apply a reliability score to each source, and determine the location of the user based upon the source with the largest reliability score (e.g., the most reliable source). In some embodiments, the reliability score may be determined by a user-inputted or system administrator defined value. For example, the apparatus may be configured by an administrator to associate location data received directly from a mobile device as having the highest reliability score. In such an embodiment, the apparatus would default to utilizing the mobile device location data in further steps of the method due to the mobile device being assigned the highest reliability score.

In some embodiments, the apparatus may employ a user confirmation notification. Upon receiving location data from multiple sources which may, in some situations, indicate conflicting locations, the apparatus may transmit a notification to the mobile device requesting confirmation of the location of the mobile device. By way of example, the environmental pertinence server may receive a plurality of device location data points associated with a mobile device, and may transmit a notification to the mobile device, to which a user may confirm the location of the mobile device (e.g., Are you in the conference room?). As discussed below, the environmental pertinence server may employ machine learning or a trainable model such that, over time, the environmental pertinence server, through receiving a plurality of user confirmations, may improve the determination of location of mobile devices, environmental objects, and the like.

In some embodiments, the environmental pertinence server may determine the proximity threshold by analyzing device location data associated with multiple mobile devices located in a defined area accessing a common digital content item. By way of example, eight (8) mobile devices may be located in a conference room accessing a shared workspace. The environmental pertinence server, via instructions executed by the environmental pertinence module, may determine that a proximity threshold should be adjusted to reflect the device location data of these eight (8) mobile devices.

In some further embodiments, the environmental pertinence server may employ machine learning, or equivalent technology, to improve future determinations of the proximity threshold. In some examples, the environmental pertinence server may generally provide a trained model that is given a set of input features, and is configured to provide an output of a score (e.g., reliability score), a recommendation, or the like. In some embodiments, a trained model can be generated using supervised learning or unsupervised learning. In some examples, such learning can occur offline, in a system startup phase, or could occur in real-time or near real-time during performing the methods shown in the described figures (e.g., determining location). The trained model may comprise the results of clustering algorithms, classifiers, neural networks, ensemble of trees in that the trained model is configured or otherwise trained to map an input value or input features to one of a set of predefined output scores or recommendations, and modify or adapt the mapping in response to historical data returned from previous iterations (e.g., determining the location of one or more environmental objects).

Alternatively or additionally, the trained model may be trained to extract one or more features from historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd based input, or the like (e.g., user confirmations).

In some examples, the environmental pertinence server may be configured to apply a trained model to one or more inputs to identify a set of reliability scores. For example, if the input feature was device location data from a mobile device, the environmental pertinence server may apply the location date to the trained model to determine whether the device location data is accurate. In some examples, the trained model would output a suggested reliability score based on other mobile devices that had the same device location data.

Upon satisfying the proximity threshold at Block 410, the apparatus query a digital content item database at Block 412, and may identify a preliminary environmental pertinence digital item content set at Block 414. The apparatus (e.g., environmental pertinence server) may be in communication with a digital content item database (e.g., digital content item database 116 in FIG. 1) such that the apparatus may transmit a request to the digital content item database to retrieve digital content items associated with the various environmental objects and the mobile device requesting an interface. The digital content item database 116 may contain all digital content items associated with software applications known by the system 100. The apparatus may associate digital content items with the environmental identified objects in order to create a preliminary environmental pertinence digital content item set. By way of example, the second mobile device of the system (e.g., an environmental object) may have voice chat applications and collaborative workspaces (e.g., digital content items) associated with the device. The method may identify these digital content items as pertinent due to their additional association with the first mobile device.

The apparatus may then apply user permission rules to the pertinence digital content item set at Block 416 and determine if user permissions exist for the digital content items at Block 418. The apparatus (e.g., environmental pertinence server) may be in communication with a permissions database (e.g., permissions database 112 in FIG. 1) such that the apparatus may transmit a request to the permissions database to retrieve user permissions associated with various environmental objects and the mobile device requesting an interface. These user permission rules may be associated with each mobile device or environmental object, and may define a unique user's/object's right to access a digital content item. By way of example, a first mobile device associated with a first user profile may have permission to access a collaborative workspace (e.g., digital content item), while a second mobile device (e.g., environmental object) associated with a second user profile may not have permission to access the same collaborative workspace. The apparatus may, based upon the user permissions associated with each mobile device and/or environmental object, determine digital content items for which each mobile device and environmental object possesses valid user permissions to access the digital content items.

Upon determining that user permissions exist to access the digital content items, the apparatus may generate a user-permitted environmental pertinence digital content set at Block 422. This user-permitted environmental pertinence digital content set may include digital content items associated with an identified environmental object, and only include those digital content items for which valid permissions exist (i.e., digital content items of the preliminary digital content item set for which valid user permissions do not exist are filtered out). The apparatus may then generate an environmental pertinence interface based upon the user-permitted environmental pertinence digital content set at Block 424. This environmental pertinence interface may, in some embodiments, be transmitted to a mobile device at Block 426. In such an embodiment, the mobile device may display the environmental pertinence interface. In some embodiments where user permission rules are not satisfied at Block 418, the apparatus may transmit a notification to the mobile device of incompatible permissions at Block 420.

With reference to FIG. 5-6, flowcharts are provided that illustrate a method for generating an environmental pertinence interface where the identified environmental object is a second mobile device and where the identified environmental object is a located object, respectively, with each step of the method described more fully in the paragraphs following. The apparatus may include receiving an interface request from a mobile device at Block 502, and may receive device location data associated with the mobile device at Block 504. The apparatus may query an environmental object location database 114 at Block 406 and may identify a second mobile device from the environmental object location database at Block 508. The apparatus may receive device location data associated with the second mobile device at Block 510. The apparatus may determine if the location data of the second mobile device compared to the location data of the first mobile device satisfies a proximity threshold at Block 512. If the second mobile device satisfies the proximity threshold, the apparatus may query a digital content item database at Block 514. The apparatus may further identify a preliminary environmental pertinence digital content item set from the digital content item database at Block 516. The apparatus may apply user permission rules to the pertinence digital content item set at Block 518. The apparatus may determine if user permissions are present for the digital content items at Block 520 and, if so, may generate a user-permitted environmental pertinence digital content set at Block 526. In some embodiments, if user permissions are not present, the apparatus may transmit a notification to the mobile device and the second mobile device of incompatible permissions at Blocks 522, 524. The apparatus may generate an environmental pertinence interface based upon the user-permitted digital content set at Block 528 and may transmit the environmental pertinence interface to the mobile device and second mobile device at Block 530, 532.

With continued reference to FIG. 5, the figure illustrates a particular embodiment of the apparatus described in FIG. 4, in which the environmental object identified at Block 508 is associated with a second mobile device. Notably, the apparatus may acquire second device location data associated with the second mobile device at Block 510 using the location determination technologies referenced above in connection with FIG. 3. Similar to the first mobile device illustrated in FIGS. 3-5, the second mobile device may transmit the location of the second mobile device to the environmental pertinence server (e.g., environmental pertinence server 102 in FIGS. 1-2) at various intervals. In other embodiments, the second mobile device may not transmit its location to the environmental pertinence server at various intervals, and may require that the environmental pertinence server request the location of the second mobile device. Additionally, the apparatus may apply user permissions associated with not only the first mobile device, but also user permissions associated with the second mobile device at Block 520. As discussed above, in an example embodiment, both mobile devices, each associated with user profiles, may also be associated with unique user permissions. The apparatus may apply both sets of user permissions in generating a user-permitted environmental pertinence digital content set at Block 526. Additionally, the apparatus may transmit notifications of incompatible permissions as well as transmitting the environmental pertinence interface to one or both of the first mobile device and the second mobile device.

FIG. 6 illustrates a particular embodiment of the apparatus described in FIG. 4 in which the environmental object identified at Block 608 is associated with a located object.

Notably, the apparatus may acquire object location data associated with the located object at Block 610. The apparatus may receive object location data associated with the located object by querying an environmental object location database 114 storing located object data. In some embodiments, the located object may be associated with an object profile. An object profile may store data related to the located object.

By way of example, a located object may be a HVAC unit, and the object profile associated with the HVAC unit may include data relating to the power consumed by the unit, the average temperature air outputted by the unit, and the time the unit has remained running, various settings, among others. Although described in conjunction with an HVAC unit, the present disclosure contemplates that a located object can be any object without limitation, and the object profile may gather and store any information without limitation.

By way of an additional example, a located object may be a conference room, and the object profile associated with the conference room may include the available seating of the conference room, the technological capabilities of the conference room, the digital content items available for use in the conference room, and the like.

Additionally, the apparatus may apply user permissions associated the first mobile device with respect to the located object at Block 620. By way of continued example referencing the HVAC unit described above, the mobile device and associated user profile may have permission to access the HVAC object profile. Specifically, the user profile associated with the mobile device may relate to a maintenance position where the HVAC object profile contains pertinence data relating to needs of the maintenance position.

With reference to FIG. 7, the figure illustrates a particular embodiment of the apparatus of FIG. 4, in which the apparatus (e.g., environmental pertinence server) identifies environmental objects relating to a located object as well as a second mobile device at Blocks 708, 710. Notably, the apparatus may acquire object location data associated with the located object at Block 712 and with the second mobile device at Block 714. Similar to the embodiments described by the apparatus found in FIGS. 5-6, the apparatus may apply user permission rules to the pertinence digital content item set relating to the first mobile device, the second mobile device, and/or the located object at Blocks 720, 722. By way of example, a first mobile device associated with a first user profile, a second mobile device associated with a second user profile, and a located object associated with an object profile may be determined by the apparatus to satisfy the proximity threshold. Specifically, the first mobile device and the second mobile device may be located in a room with an HVAC unit (e.g., located object). In such an embodiment, if the first mobile device and second mobile device have the required permissions, one or more of the devices may be provided an environmental pertinence interface containing data relating to the HVAC unit.

Although described in reference to only a second mobile device and a single located object, the present disclosure contemplates that any of the example apparatuses shown in FIGS. 3-8 may accommodate any number of mobile devices and/or located objects and further apply any number of user permissions related to each of these mobile devices.

With reference to FIG. 8, a flowchart is provided that illustrates an apparatus for generating a ranked environmental pertinence interface 800 for use with some embodiments described herein. In any of the apparatuses described in FIGS. 3-7, upon generating a user-permitted environmental pertinence digital content set (e.g., at Block 728), the apparatus may rank the user-permitted environmental pertinence digital content items. The apparatus may generate a user-permitted environmental pertinence digital content set at Block 802 and may identify one or more pertinence factors at Block 804. The apparatus may further rank the environmental pertinence digital content set according to the pertinence factors at Block 806. Upon ranking the digital content set, the apparatus may generate a ranked environmental pertinence interface at Block 808 and may transmit the ranked environmental pertinence interface to a mobile device for display at Block 810.

With continued reference to FIG. 8, the apparatus may identify one or more pertinence factors and may rank the digital content items based upon these pertinence factors at Blocks 804, 806. In some embodiments, the pertinence factors may define one of access time data, modification data, digital content size data, user exclusivity data, relationship data, authorship data, mouse over data, or key word data. In some embodiments, access time data may be stored by the environmental pertinence server (via memory 204 or the like), and may comprise data relating to the time when the digital content item has been accessed. By way of example, when the digital content item corresponds to a shared workspace, access time data may correspond to the time(s) in which a user associated mobile device or profile has accessed the shared workspace. In some embodiments, modification data may also be stored by the environmental pertinence server (via memory 204 or the like), and may comprise data relating to the time and extent of modifications made to the digital content item. By way of example, when the digital content item corresponds to a shared workspace, modification data may correspond to the time and extent of additions/deletions made to the workspace by a user associated mobile device or user profile.

In some embodiments, digital content size data may also be stored by the environmental pertinence server (via memory 204 or the like), and may comprise data relating to the size of the digital content item. By way of example, when the digital content item corresponds to a shared workspace, digital content size data may correspond to a bit size or memory space occupied by the workspace.

In some other embodiments, exclusivity data may also be stored by the environmental pertinence server (via memory 204 or the like), and may comprise data relating to the amount and/or classification of user profiles or user associated mobile devices capable of accessing the digital content item. By way of example, when the digital content item corresponds to a shared workspace, exclusivity data may relate to a workspace that is only accessible by a select number of user profiles who possess an executive position (e.g., Chief Executive Officer (CEO), Chief Financial Officer (CFO), or the like). In such an example, the exclusivity data may be used to rank the digital content item higher than other digital content items which may be accessible by a larger set of user profiles. Said another way, the digital content items which are more exclusive (e.g., accessible by a smaller set of user profiles) may be ranked higher than other digital content items which are less exclusive (e.g., accessible by a larger set of user profiles). In some further embodiments, key word data may also be stored by the environmental pertinence server (via memory 204 or the like) and may comprise data relating to flagged or tagged words located in the digital content item. By way of example, when the digital content item corresponds to a shared workspace, key word data may identify words relating to the user profile or user associated mobile device (e.g., the word maintenance may be flagged for a user profile associated with a maintenance position).

In some embodiments, relationship data, authorship data, and mouse over data may also be stored by the environmental pertinence server (via memory 204 or the like). Relationship data may relate to the relationship between two user profiles associated with two mobile devices. In some embodiments, the apparatus may be configured to determine the relationship between two or more parties and rank or display digital content items accordingly. By way of example, when the relationship data from the user profiles associated with two mobile devices indicates that the two users are unfamiliar with one another (e.g., by reviewing location data associated with the user, lack of prior calendared meetings between the users, and the like), the interface may display digital content items corresponding to each user's identity data (e.g., title and position within a company). In the alternative, when the relationship data from the user profiles associated with two mobile devices indicates that the two users are familiar with one another, the interface may not display identity data associated with the users.

Authorship data may also be stored by the environmental pertinence server (via memory 204 or the like), and may comprise data relating to identifying the user who created the digital content item. By way of example, when the digital content item corresponds to a shared workspace, authorship data may determine that a mobile device and associated user profile created the digital content item and may rank this digital content item higher than other digital content items not authored by the user profile. In some further embodiments, mouse over data may also be stored by the environmental pertinence server (via memory 204 or the like) and may comprise data relating the amount of times an input device (e.g., mouse, trackpad, and the like) has passed over or selected a digital content item.

In FIG. 8, digital content items may be ranked according to these pertinence factors at Block 806. By way of a particular example, user-permitted digital content items corresponding to shared workspaces, video chat services, stored word processing documents, and service desk requests may be found in the user-permitted environmental digital content set. The apparatus 800 may determine that the access data and modification data relating to a particular shared workspace indicates that this digital content item is most pertinent. The apparatus may then order the digital content items in the environmental pertinence interface such that the shared workspace is listed first or most prominently, and the environmental pertinence interface now defines a ranked environmental pertinence interface at Block 808.

As discussed in combination with any of the above embodiments illustrated in FIGS. 3-8, an environmental pertinence interface may be generated by an environmental pertinence server, and more specifically, by an environmental pertinence module. With reference to FIG. 9, an example software interface 900 is shown containing an environmental pertinence interface 902. As shown in FIG. 9, the software interface 900 presents various digital content items 904 in an accessible list as the environmental pertinence interface 902. As discussed above with reference to FIG. 8, the digital content items 904 may be ranked according to the method of apparatus 800 and presented as a ranked environmental pertinence interface.

In some embodiments, the environmental pertinence interface generated by the environmental pertinence module housed in the environmental pertinence server may indicate the location or presence of a mobile device associated with a user profile. With reference to FIG. 10, a presence interface 1000 is illustrated wherein the location status 1002 and 1004 are indicated by the presence interface 1000. The presence interface 1000 and location status 1002 and 1004 may also be utilized in any of the environmental pertinence interfaces generated by the apparatus found in FIGS. 3-8, described above.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an environmental pertinence server 102 employing an embodiment of the present invention and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A host server configured to provide first backend server functionality for a location-based service to a client device operated by an end user, the host server comprising:
   a memory; and
   a processor allocation configured to access the memory to retrieve one or more executable assets that, when executed by the processor instantiate the location-based service, the location-based service configured to:
   communicably couple to the client device, the client device associated with a user account;
   receive from the client device a sequence of messages, each comprising comprising respective first location data describing a first geographic location corresponding to an updated geographic location of the client device;
   for each received message of the sequence of messages:
   query a database with the respective first location data;
   receive from the database in response to the query, second location data, the second location data describing a second geographic location;
   determining that the user account is permitted to access the data object; determining that a distance separating the second geographic location and the first geographic location satisfies a proximity threshold; and
   in response to determining that the distance does satisfy the proximity threshold, causing to be displayed at a graphical user interface of a frontend application communicably coupled to a backend providing second backend server functionality for a collaboration tool, the frontend application executing on the client device, at least one graphical user interface element corresponding to the data object.

2. The host server of claim 1, wherein the first location data corresponds to a physical location of the client device.

3. The host server of claim 1, wherein: the client device is a first client device; and the data object is associated with a second client device.

4. The host server of claim 1, wherein the location-based service is configured to transmit the graphical user interface to the client device.

5. The host server of claim 1, wherein the first location data corresponds to a calendar entry stored by the client device.

6. The host server of claim 1, wherein the first location data comprises wireless network information.

7. The host server of claim 1, wherein the message comprise credentials associated with the user account.

8. The host server of claim 1, wherein the client device is a mobile device and the data object is associated with a stationary device.

9. A method of processing location information to provide a location-specific graphical user interface to a client device, the method comprising:
   receiving a set of messages at a server from the client device at a regular interval, each message of the set of messages comprising respective location data; for each respective message of the set of messages:
   querying by the server, a location database with the first location data and a proximity threshold;
   receiving at the server, in response to the query, a set of data objects each comprising an attribute with second location data corresponding to a respective geographic location of a second client device;
   filtering at the server, the set of data objects based on a credential associated with the client device; and
   causing by the server, to be displayed at a graphical user interface a frontend application communicably coupled to a backend providing second backend server functionality for a collaboration tool, the frontend application executing on the client device, a list comprising the filtered set of data objects.

10. The method of claim 9, wherein at least one data object of the filtered set of data objects corresponds to an electronic device.

11. The method of claim 9, wherein at least one data object of the filtered set of data objects corresponds to a physical location.

12. The method of claim 9, wherein at least one data object corresponds at least in part to digital data associated with a software platform and the second location data of the at least one data object is associated with a physical location.

13. The method of claim 12, wherein the physical location is a meeting room and digital data relates to a meeting associated with the meeting room.

14. A method of operating a client device location information to provide a location-specific graphical user interface to a client device, the method comprising:
   receiving a series of messages at a server from the client device at a regular interval, each message of the set of messages comprising a geographic location of the client device;
   for each respective received message:
   querying, by the server, a database with the respective geographic location associated with the respective received message;
   receiving as a result of the query, at least one geographic location within a threshold distance of the respective geographic location;
   determining, based on the at least one geographic location, a digital content item associated with the at least one geographic location and associated with a collaboration tool selected from a group consisting of:
   an issue tracking system; and
   a documentation system; and
   causing to be displayed on a display of the client device, the digital content item.

15. The method of claim 14, wherein the digital content item is selected, at least in part, based on a calendar event associated with a user of the client device.

16. The method of claim 15, wherein the digital content item is stored by a collaboration tool associated with the calendar event.

17. The method of claim 14, wherein, prior to causing the digital content item to be displayed on the client device, determining that a user of the client device is permitted to view the digital content item.

* * * * *